United States Patent
Oyama et al.

(10) Patent No.: US 12,290,821 B2
(45) Date of Patent: May 6, 2025

(54) ELECTRIC PULSE DECOMPOSITION METHOD, COMPOSITE MATERIAL, AND COMPOSITE MATERIAL DECOMPOSITION METHOD

(71) Applicants: HONDA MOTOR CO., LTD., Tokyo (JP); WASEDA UNIVERSITY, Tokyo (JP); NATIONAL UNIVERSITY CORPORATION KUMAMOTO UNIVERSITY, Kumamoto (JP)

(72) Inventors: Satoshi Oyama, Saitama (JP); Naoki Kishimoto, Tokyo (JP); Chiharu Tokoro, Tokyo (JP); Soowon Lim, Tokyo (JP); Taketoshi Koita, Tokyo (JP); Masataka Kondo, Tokyo (JP); Takao Namihira, Kumamoto (JP)

(73) Assignees: HONDA MOTOR CO., LTD. (JP); WASEDA UNIVERSITY (JP); NATIONAL UNIVERSITY CORPORATION KUMAMOTO UNIVERSITY (JP)

( * ) Notice: Subject to any disclaimer, the term of this patent is extended or adjusted under 35 U.S.C. 154(b) by 409 days.

(21) Appl. No.: 17/676,841

(22) Filed: Feb. 22, 2022

(65) Prior Publication Data
US 2022/0323967 A1     Oct. 13, 2022

(30) Foreign Application Priority Data

Apr. 13, 2021   (JP) ................................. 2021-067819

(51) Int. Cl.
*B02C 19/18*    (2006.01)
*H01B 7/38*     (2006.01)
*H01B 15/00*    (2006.01)

(52) U.S. Cl.
CPC ............... *B02C 19/18* (2013.01); *H01B 7/38* (2013.01); *B02C 2019/183* (2013.01); *H01B 15/00* (2013.01)

(58) Field of Classification Search
CPC .............. H01B 7/08; H01B 7/38; B02C 19/18
See application file for complete search history.

(56) References Cited

U.S. PATENT DOCUMENTS

2006/0051637 A1   3/2006  Kushibiki et al.
2015/0044450 A1   2/2015  Yuasa et al.
(Continued)

FOREIGN PATENT DOCUMENTS

CN   103781627 A   5/2014
CN   106853411 A   6/2017
(Continued)

OTHER PUBLICATIONS

Office Action issued Apr. 25, 2024 in the CN Patent Application No. 202210162203.5.
(Continued)

*Primary Examiner* — Chau N Nguyen
(74) *Attorney, Agent, or Firm* — CKC & Partners Co., LLC

(57) ABSTRACT

An electric pulse decomposition method for separating a composite material by an electric pulse, the composite material being obtained by bonding or joining a plurality of conductors to each other with an insulating member, the electric pulse decomposition method including a protrusion formation step for forming a protrusion in a specific site, on a side on which the composite material is arranged, of at least one of the plurality of conductors, and a separation step for separating the plurality of conductors in the composite material 1 by respectively bringing electrodes into contact with surfaces of the plurality of conductors and applying an
(Continued)

electric pulse between the electrodes to destroy the insulating member. This makes it possible to separate the plurality of conductors from the composite material by making a shock wave caused by a current of the dielectric breakdown functioning as an adhesive to effectively destroy the insulating member.

6 Claims, 7 Drawing Sheets

(56) References Cited

U.S. PATENT DOCUMENTS

| | | |
|---|---|---|
| 2017/0298231 A1 | 10/2017 | Yuasa et al. |
| 2017/0348700 A1 | 12/2017 | Suzuki et al. |
| 2018/0112084 A1 | 4/2018 | Kawamura et al. |
| 2019/0330478 A1 | 10/2019 | Kawamura et al. |

FOREIGN PATENT DOCUMENTS

| | | |
|---|---|---|
| CN | 107000379 A | 8/2017 |
| CN | 107406989 A | 11/2017 |
| CN | 107457067 A | 12/2017 |
| CN | 108993730 A | 12/2018 |
| CN | 110073034 A | 7/2019 |
| EP | 3178562 A1 | 6/2017 |
| EP | 3412363 A1 | 12/2018 |
| JP | H1057833 A | 3/1998 |
| JP | 2005161151 A | 6/2005 |
| JP | 2006205113 A | 8/2006 |
| JP | 2007090229 A | 4/2007 |
| JP | 2017104796 A | 6/2017 |
| JP | 2017136516 A | 8/2017 |
| JP | 2017217644 A | 12/2017 |
| JP | 2020069454 A | 5/2020 |
| JP | 2021006724 A | 1/2021 |
| JP | 2021175566 A | 11/2021 |
| WO | 2019234109 A1 | 12/2019 |

OTHER PUBLICATIONS

Office Action issued in the U.S. Appl. No. 18/146,388, mailed on Dec. 15, 2023.
Office Action issued in the CN Patent Application No. 202210162203.5, mailed on Dec. 1, 2023.
Office Action issued in the CN Patent Application No. 202210162203.5, mailed on May 13, 2023.
Notification of Reasons for Refusal issued Dec. 3, 2024 in the JP Patent Application No. 2021-067819.

FIG. 4

| | | G [mm] (H [mm]) | | | |
|---|---|---|---|---|---|
| | | 1.5 (2.5) | 1.0 (3.0) | 0.5 (3.5) | 0.0 (4.0) |
| D [mm] | 2 | × | ○ | × | ◎ |
| | 4 | × | × | ○ | ◎ |
| | (6) | (×) | (○) | (◎) | (◎) |
| | 8 | × | ◎ | ◎ | ◎ |

R(SMALL)　　　R(MEDIUM)　　　R(LARGE)

◎ : EXTREMELY EFFECTIVE
○ : SOMEWHAT EFFECTIVE
× : HARDLY EFFECTIVE

ELECTRIC PULSE DECOMPOSITION METHOD, COMPOSITE MATERIAL, AND COMPOSITE MATERIAL DECOMPOSITION METHOD

This application is based on and claims the benefit of priority from Japanese Patent Application No. 2021-067319, filed on 13 Apr. 2021, the content of which is incorporated herein by reference.

BACKGROUND OF THE INVENTION

Field of the Invention

The present invention relates to an electric pulse decomposition method, a composite material, and a composite material decomposition method.

Related Art

In recent years, a vehicle body assembling method for bonding or joining a plurality of conductor components constituting a vehicle body of an automobile to one another using an adhesive has been gaining popularity. The method contributes to a reduction in weight of the vehicle body, thereby showing signs of becoming pervasive at home and abroad. On the other hand, there has also been a movement of disassembling a vehicle body of a discarded vehicle into a plurality of components and reusing available ones of the components. To a composite material obtained by bonding or joining a plurality of conductors among the components to one another with an insulating member functioning as an adhesive, an electric pulse decomposition method for separating the plurality of conductors by applying an electric pulse to destroy the adhesive may be applied. More generally, there has been a proposal on an improvement in a method for decomposing an object by an electric pulse, the object being obtained by joining or bonding an insulator and a conductor to each other (see, e.g., Patent Document 1).

Patent Document 1: Japanese Unexamined Patent Application, Publication No. 2020-69454

SUMMARY OF THE INVENTION

In a technique described in Patent Document 1, a plurality of electrodes are respectively brought into contact with spaced positions on a surface of the object obtained by joining or bonding the insulator and the conductor to each other, and a voltage is applied between the electrodes to decompose the object into the insulator and the conductor. However, in the technique described in Patent Document 1, there is no discussion on a position on a space on which an electric field caused by the application of the voltage is concentrated. To concentrate the electric field at an intended position to destroy an insulating member, a thin line needs to be applied to apply the voltage. However, it is difficult to select a site where the thin line is brought into contact with the conductor.

The present invention is directed to providing an electric pulse decomposition method capable of separating a plurality of conductors from a composite material by making a dielectric breakdown occur in a simple method and making a shock wave, heat, material vaporization and expansion, or the like (hereinafter referred to as a shock wave or the like) caused by the dielectric breakdown, and a discharge induced thereby act on the inside of an insulating member functioning as an adhesive to effectively destroy the insulating member, the composite material, and a composite material decomposition method.

(1) An electric pulse decomposition method for separating a composite material (e.g., a composite material 1, described below) by an electric pulse, the composite material being obtained by bonding or joining a plurality of conductors (e.g., a first conductor 7 and a second conductor 8, described below) to each other with an insulating member (e.g., an insulating member 9, described below), the electric pulse decomposition method including a protrusion formation step (e.g., a protrusion formation step S1, described below) for forming a protrusion (a protrusion 10, described below) in a specific site, on a side on which the insulating member is arranged, of at least one of the plurality of conductors (e.g., the first conductor 7, described below), and a separation step (e.g., a separation step S2, described below) for separating the plurality of conductors in the composite material by respectively bringing electrodes (e.g., a positive electrode 12 and a negative electrode 14, described below) into contact with surfaces of the plurality of conductors and applying an electric pulse between the electrodes to destroy the insulating member.

(2) A composite material (e.g., a composite material 1, described below) obtained by bonding or joining a predetermined first conductor (e.g., a first conductor 7, described below) and a predetermined second conductor (e.g., a second conductor 8, described below) to each other with an insulating member (e.g., an insulating member 9, described below) and to be separated from each other by an electric pulse, the composite material (e.g., the composite material 1, described below) including a protrusion (e.g., a protrusion 10, described below) provided in at least one of the first conductor and the second conductor (e.g., the first conductor 7, described below) to protrude toward the other conductor (e.g., the second conductor 8, described below), and an insulating member (e.g., the insulating member 9, described below) to be applied in a region including a site where the protrusion is provided and bonding or joining the first conductor and the second conductor to each other.

(3) A composite material decomposition method including a composite material formation step (e.g., a composite material formation step S81, described below) for forming a composite material (e.g., a composite material 1, described below) by applying an insulating member (e.g., an insulating member 9, described below) to a first conductor (e.g., a first conductor 7, described below) including a predetermined protrusion (e.g., a protrusion 10, described below) and bonding or joining the first conductor and a second conductor (e.g., a second conductor 8, described below) positioned on a protruding end side of the protrusion to each other with the insulating member, and a separation step (e.g., a separation step S82, described below) for separating the first conductor and the second conductor from each other by applying an electric pulse between the first conductor and the second conductor to destroy the insulating member.

(4) The electric pulse decomposition method in the foregoing item (1), in which a height of the protrusion is three-fourths or more of a thickness dimension of the insulating member.

(5) The composite material in the foregoing item (2), in which a height of the protrusion is three-fourths or more of a thickness dimension of the insulating member.

(6) The composite material decomposition method in the foregoing item (3), in which a height of the protrusion is three-fourths or more of a thickness dimension of the insulating member.

(7) The electric pulse decomposition method in the foregoing item (4), in which an insulating film is formed in another conductor among the plurality of conductors, and the protrusion contacts the film.

(3) The composite material in the foregoing item (5), in which an insulating film is provided in another conductor among the plurality of conductors, and the protrusion contacts the film.

(9) The composite material decomposition method in the foregoing item (6), in which an insulating film is formed in another conductor among the plurality of conductors, and the protrusion contacts the film.

In the electric pulse decomposition method described in the item (1), a dielectric breakdown easily occurs between the protrusion formed in the protrusion formation step and the conductor close to and opposing the protrusion, and an action of a shock wave or the like caused by a current of the dielectric breakdown is made to occur in the insulating member to effectively destroy the insulating member, thereby making it possible to separate the plurality of conductors constituting the composite material from each other.

In the composite material described in the item (2), a dielectric breakdown easily occurs between a distal end of the protrusion and the first conductor or the second conductor close to and opposing the distal end, and a shock wave caused by a current of the dielectric breakdown is not released to the periphery of the insulating member to effectively destroy the insulating member, thereby making it possible to separate the plurality of conductors constituting the composite material from each other.

In the composite material decomposition method described in the item (3), in the composite material formation step, the insulating member functioning as an adhesive is previously applied to the first conductor including the protrusion, and the first conductor and the second conductor positioned on the protruding end side of the protrusion are bonded or joined to each other to form the composite material. Accordingly, in the separation step, when the electric pulse is applied to the first conductor and the second conductor, a dielectric breakdown easily occurs between the protrusion in the first conductor and the second conductor close to and opposing the protrusion. This makes it possible to separate the plurality of conductors constituting the composite material from each other by effectively destroying the insulating member by a shock wave or the like caused by a current of the dielectric breakdown.

In the electric pulse decomposition method described in the item (4), the height of the protrusion is appropriate, a dielectric breakdown easily occurs at the time of application of the electric pulse, and an action of a shock wave or the like caused by a current of the dielectric breakdown is made to occur in the insulating member to effectively destroy the insulating member, thereby making it possible to easily separate the plurality of conductors constituting the composite material from each other.

In the composite material described in the item (5), the height of the protrusion is appropriate, a dielectric breakdown easily occurs at the time of application of the electric pulse, and the insulating member is effectively destroyed by a shock wave or the like caused by a current of the dielectric breakdown, thereby making it possible to separate the plurality of conductors constituting the composite material from each other.

In the composite material decomposition method described in the item (6), the height of the protrusion is appropriate, a dielectric breakdown easily occurs at the time of application of the electric pulse, and an action of a shock wave or the like caused by a current of the dielectric breakdown is made to occur in the insulating member to effectively destroying the insulating member, thereby making it possible to separate the plurality of conductors constituting the composite material from each other.

In the electric pulse decomposition method described in the item (7), when the protrusion contacts a film, a mechanism for managing the thickness of the insulating member functioning as an adhesive and a mechanism for accurately making a dielectric breakdown occur to effectively destroy the insulating member are the same, thereby achieving simplification.

In the composite material described in the item (8), when the protrusion contacts a film, a mechanism for managing the thickness of the insulating member functioning as an adhesive and a mechanism for accurately making a dielectric breakdown occur to effectively destroy the insulating member are the same, thereby achieving simplification.

In the composite material decomposition method described in the item (9), when the protrusion contacts a film, a mechanism for managing the thickness of the insulating member functioning as an adhesive and a mechanism for accurately making a dielectric breakdown occur to effectively destroy the insulating member are the same, thereby achieving simplification.

BRIEF DESCRIPTION OF THE DRAWINGS

FIG. 4 is a diagram illustrating each of dimensions of a protrusion defined in FIG. 3 and its test result;

DETAILED DESCRIPTION OF THE INVENTION

Figure 1:
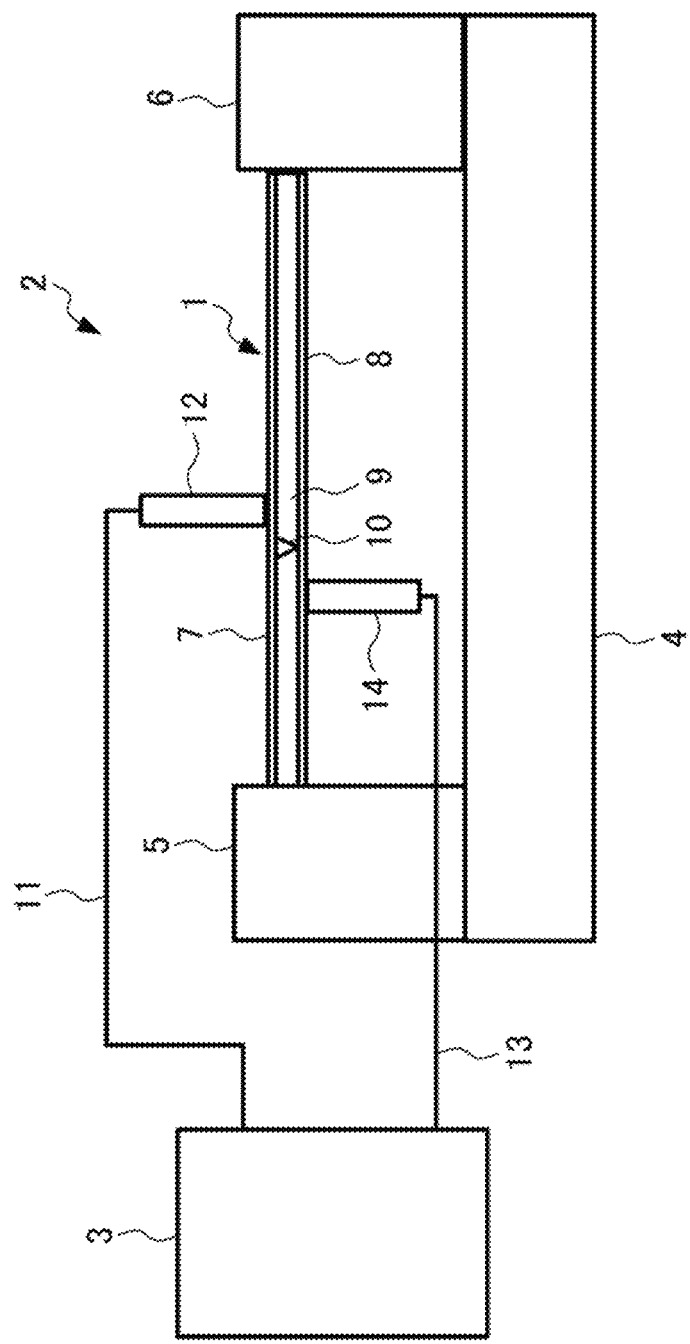
FIG. 1 is a conceptual diagram illustrating an outline of the present invention.

FIG. 1 is a conceptual diagram illustrating an outline of the present invention. The present invention relates to a method of separating a composite material 1 obtained by bonding or joining conductors such as steel plates to each other with an adhesive into the conductors by application of an electric pulse, and a composite material adapted to the method. In FIG. 1, a high-voltage pulse is applied between both upper and lower surfaces of a composite material 1 from a high-voltage pulse generation device 3 with the composite material 1 gripped by a gripping apparatus 2.

The gripping apparatus 2 grips the composite material 1 to maintain a horizontal posture with the composite material 1 sandwiched from its one side portion and other side portion by a fixed gripping member 5 and a movable gripping member 6 provided in a base 4. The composite material 1 is configured by bonding or joining a first conductor 7 on its upper surface side and a second conductor 8 on its lower surface side to each other with an insulating member 9 functioning as an adhesive. A protrusion 10 protruding toward the second conductor 8 is provided on a surface opposing the second conductor 8 in a specific site of the first conductor 7.

A positive electrode 12 to be brought into contact with an upper surface of the first conductor 7 is connected to an end portion of a positive electrode cable 11 to be derived from the high-voltage pulse generation device 3. A negative electrode 14 to be brought into contact with a lower surface of the second conductor 8 is connected to an end portion of a negative electrode cable 13 to be derived from the high-voltage pulse generation device 3.

In one embodiment of the present invention, a high-voltage pulse as an electric pulse to be generated by the high-voltage pulse generation device 3 is applied between the positive electrode 12 and the negative electrode 14, to destroy the insulating member 9 functioning as an adhesive by a shock wave or the like caused by a current of a dielectric breakdown, thereby separating the first conductor 7 and the second conductor 8 from each other.

Figure 2:
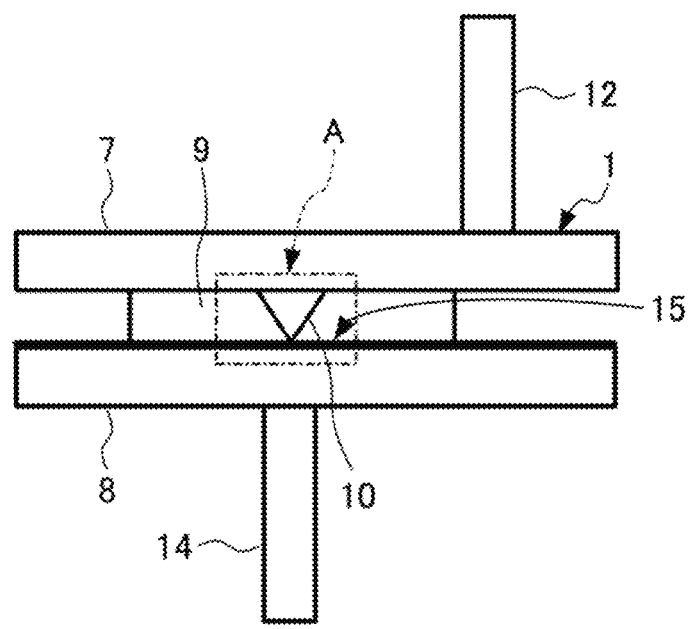
FIG. 2 is a diagram illustrating an embodiment of the present invention.
Figure 3:
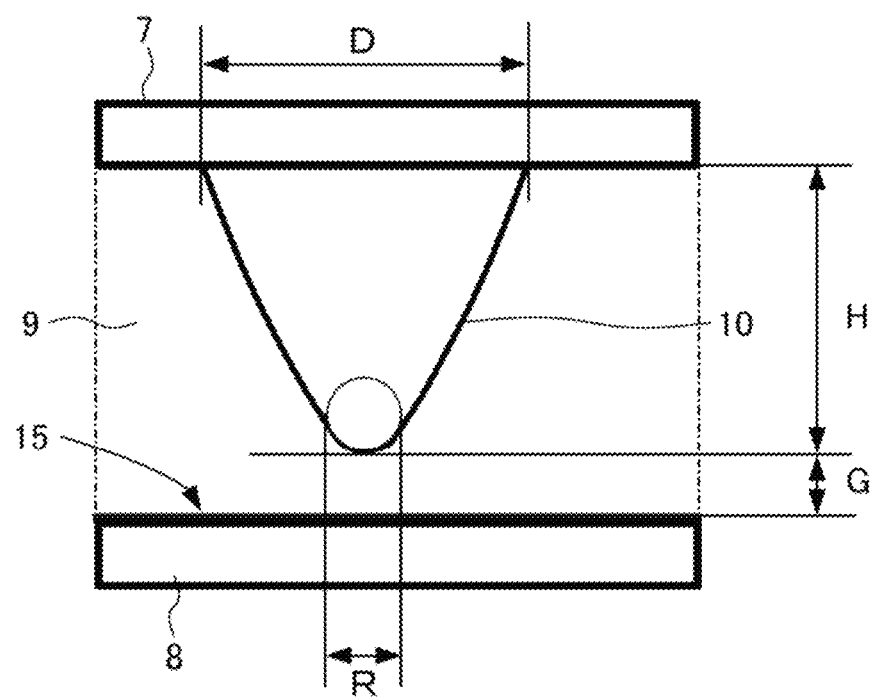
FIG. 3 is a partially enlarged view of FIG. 2.

FIG. 2 is a diagram illustrating an embodiment of the present invention, and FIG. 3 is an enlarged view of a portion A illustrated in FIG. 2. In FIG. 2 and FIG. 3, portions corresponding to those illustrated in FIG. 1 are respectively assigned the same reference numerals. For example, the first conductor 7 and the second conductor 8, which are each a steel plate, are bonded or joined to each other with the insulating member 9 functioning as an adhesive, to constitute the composite material 1. The positive electrode 12 is brought into contact with the upper surface as an outer surface of the first conductor 7. The negative electrode 14 is brought into contact with the lower surface as an outer surface of the second conductor 8.

The protrusion 10 protruding toward the second conductor 8 is provided on a surface opposing the second conductor 8 as a lower surface of the first conductor 7. The protrusion 10 may be formed, as a recess is formed by hitting a punch against the outer surface side of the first, conductor 7, as a protrusion formed on a surface on the opposite side thereto. The protrusion 10 may be formed to pile up a welded piece of a conductor using a welding machine in a formation-scheduled site of the protrusion 10 on the surface opposing the second conductor 8 as the lower surface of the first conductor 7. The second conductor 8 is an electrodeposition-coated steel plate having an insulating eiectrodeposition coating film 15 provided on its surface on the insulating member 9 side thereof.

The protrusion 10 is provided between the first conductor 7 and the second conductor 8 to make it easy to generate a shock wave or the like due to a dielectric breakdown between both the conductors 7 and 8 when a high-voltage electric pulse is applied using the positive electrode 12 and the negative electrode 14. In other words, the protrusion 10 decreases a dielectric strength between both the conductors 7 and 3, thereby making it easy to cause a dielectric breakdown.

Although the dielectric breakdown is a well-known phenomenon, the phenomenon will be simply described. When a high voltage is applied between positive and negative electrodes opposing each other with a gap sandwiched therebetween, electrons originally existing between gaps start to move toward a positive side electrode, and cations start to move toward a negative side electrode. At this time, electrons are released from molecules floating between the gaps due to collision of the electrons with the floating molecules at high speed. When the electrons thus released are further released from the floating molecules, an electron avalanche occurs so that a dielectric breakdown occurs between the gaps.

The inventors have repeated various experiments, have applied various materials to a base material of a site constituting the protrusion 10 and the insulating member 9 functioning as an adhesive, and have changed a voltage to be applied between the positive electrode 12 and the negative electrode 14 for each their combination, to find out a shape of the protrusion 10 in which a dielectric breakdown easily occurs from among various types of conditions. That is, a verification result that the shape of the protrusion 10 is desirably a cone pointed toward the second conductor 8 side from the first conductor 7 side.

The insulating member 9 functioning as an adhesive is interposed between the first conductor 7 and the second conductor 8. Thus, a notch having a V-shaped cross section corresponding to the protrusion 10 as the cone is provided on the insulating member 9 side.

Then, respective dimensions of portions of the protrusion 10 will be defined with reference to FIG. 3 as an enlarged view of the portion A illustrated in FIG. 2. Let a diameter D be a diameter of a bottom surface portion of a cone pointed downward as a virtual boundary surface between the protrusion 10 as the cone and the first conductor 7. Let a height H be a protruding dimension directed toward the second conductor 8 from the bottom surface portion of the cone as the virtual boundary surface between the protrusion 10 and the first conductor 7. Let G be a gap between a vertex of the protrusion 10 and an upper surface of the second conductor 8. Let R be a diameter of a virtual circle inscribed in the vertex of the protrusion 10 as the cone pointed downward. Let R be a diameter corresponding to a radius of curvature r of the vertex of the protrusion 10.

FIG. 4 is a diagram illustrating each of the dimensions of the protrusion 10 defined in FIG. 3 and its test result. As prescribed conditions in a test, a distance between the lower surface of the first conductor 7 and the upper surface of the second conductor 8 as the thickness dimension of the insulating member 9 functioning as an adhesive is approximately 4 mm. A unit of the diameter D is mm, and a value of the diameter D is set as 2, 4, (6), and 8. The value (6) is a predicted value. A unit of the gap G and the height H (written in parentheses) corresponding thereto is mm, and a value of the gap G (the height H) is set as 1.5 (2.5), 1.0 (3.0), 0.5 (3.5), and 0.0 (4.0). A value indicated in parentheses in the test result is a predicted value.

In FIG. 4, the test result "extremely effective" means a state where a dielectric breakdown between the first conductor 7 and the second conductor 8 reliably occurs even if an applied voltage between the positive electrode 12 and the negative electrode 14 has a relatively low value. In this state, even if the applied voltage is not made too high, the first conductor 7 and the second conductor 8 can be separated from each other by reliably destroying the insulating member 9 functioning as an adhesive. On the other hand, "hardly effective" means a state where a dielectric breakdown does not occur even if the above-described applied voltage is set to a relatively high value so that the first conductor 7 and the second conductor 8 cannot be separated from each other. "Somewhat effective" means a state where a dielectric breakdown is tentatively made to occur, although not so much as in "extremely effective".

The following tendency is generally read from the test results illustrated in FIG. 4. That is, such a tendency that the smaller R is and the more sharply the vertex of the protrusion 10 is pointed, the more a dielectric breakdown is made to occur even if the diameter D and the gap G are large is read. When the gap G exceeds a predetermined limit, a dielectric breakdown does not occur regardless of the respective values of R and D. Briefly, it has been confirmed that a substantially good result is obtained when the height H of the protrusion 10 is three-fourths or more of the thickness dimension of the insulating member 9. There is such a tendency that the smaller the gap G is, the more easily a dielectric breakdown occurs.

Figure 5:
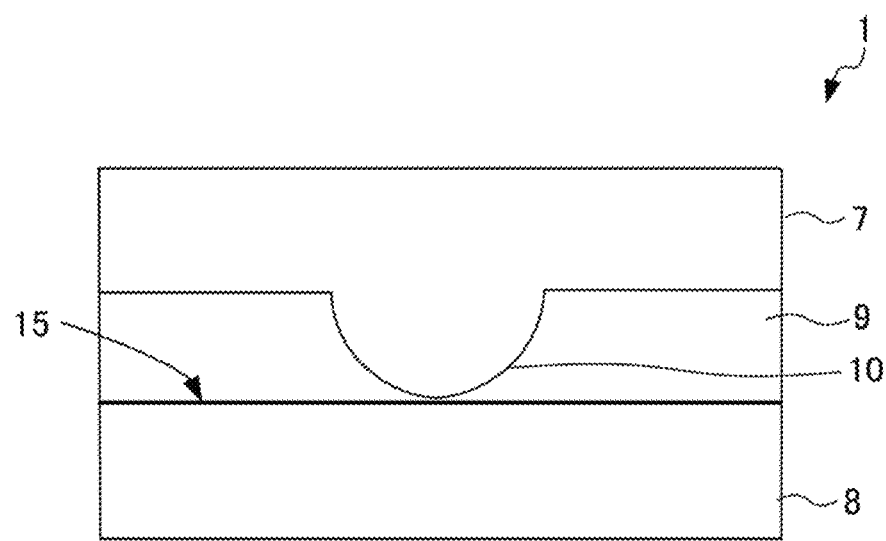
FIG. 5 is a diagram illustrating a modification to the embodiment illustrated in FIG. 2.

When the gap G is 0.0, i.e., in a state where the vertex of the protrusion 10 contacts the second conductor 8, a dielectric breakdown can be reliably made to occur regardless of the diameters D and R. That is, even if a projection having a semi-spherical shape is applied to the protrusion 10, like in FIG. 5 as a modification to the present embodiment, a dielectric breakdown can be reliably made to occur. In FIG. 5, portions corresponding to those illustrated in FIG. 2 and FIG. 3 are also respectively assigned the same reference numerals, and description related to the same reference numerals will be referred to for the description of the portions. As described with reference to FIG. 2 and FIG. 3, an insulating electrodeposition coating film 15 is provided in the second conductor 8. Thus, even if the vertex of the protrusion 10 contacts the second conductor 8, electrical conduction in a contact site does not, by itself, occur.

With a distal end of the protrusion 10 contacting the second conductor 8, a dielectric breakdown can be reliably made to occur regardless of the diameters D and R, which means that when the protrusion 10 is provided, the thickness of the insulating member 9 as a spacing between the first conductor 7 and the second conductor 8 can be managed depending on the height H of the protrusion 10. Conventionally, the thickness of the insulating member 9 functioning as an adhesive has been difficult to manage, and the management has been performed by placing beads or the like into the adhesive. On the other hand, according to the present invention, when the protrusion 10 is provided, the height H thereof also contributes to the management of the thickness of the insulating member 9 functioning as an adhesive. In other words, a mechanism for managing the thickness of the insulating member 9 functioning as an adhesive and a mechanism for accurately making a dielectric breakdown occur to effectively destroy the insulating member 9 are the same.

Figure 6:
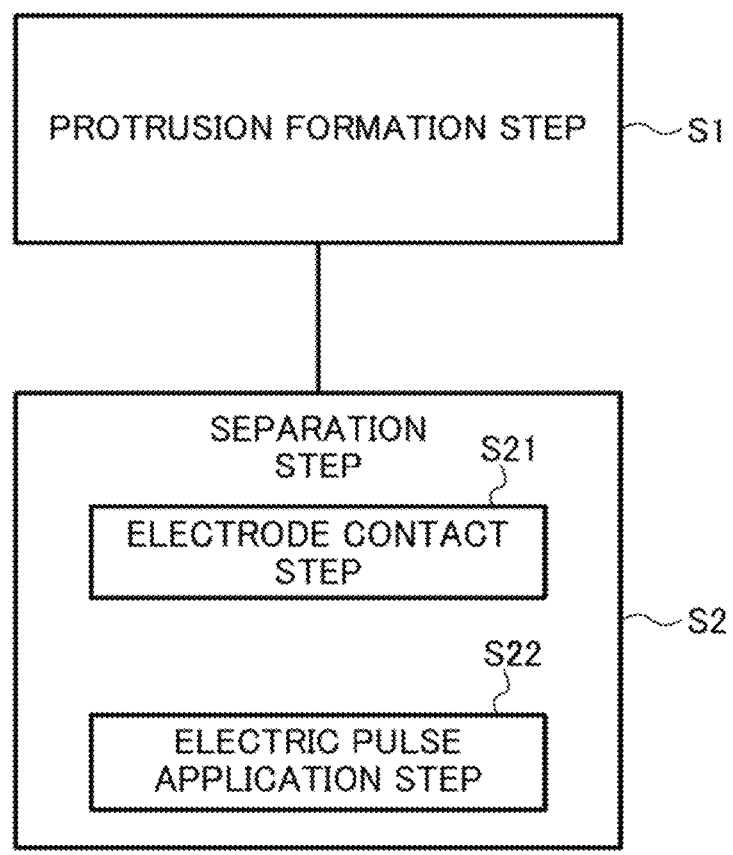
FIG. 6 is a process view illustrating an electric pulse decomposition method according to the embodiment of the present invention.

FIG. 6 is a process view illustrating an electric pulse decomposition method as an embodiment of the present invention. In FIG. 6, description is made by also appropriately referring to FIG. 1 to FIG. 3 already described. The electric pulse decomposition method includes a protrusion formation step S1 and a separation step S2. In the protrusion formation step S1, the protrusion 10 is formed in a specific site, on the side on which the insulating member 9 functioning as an adhesive is arranged, of the first conductor 7 as at least one of the first conductor 7 and the second conductor 8 as a plurality of conductors. The protrusion 10 is formed, as a recess is formed by hitting a punch against the outer surface side of the first conductor 7, as a protrusion formed on a surface on the opposite side to the recess, as already described, for example.

In the separation step S2, the positive electrode 12 is brought into contact with the first conductor 7 and the negative electrode 14 is brought into contact with the second conductor 8 in an electrode contact step S21. Then, in the electric pulse application step S22, an electric pulse as a high-voltage pulse is applied between the positive electrode 12 and the negative electrode 14 via the positive electrode cable 11 and the negative electrode cable 13 from the high-voltage pulse generation device 3.

When the electric pulse is thus applied, a shock wave or the like due to a dielectric breakdown is generated between the protruding end of the protrusion 10 and the second conductor 8. An action of the shock wave or the like is made to occur in an insulating member, to effectively destroy the insulating member. The insulating member 9 functioning as an adhesive is thus destroyed, and as a result the first conductor 7 and the second conductor 8 constituting the composite material 1 are separated from each other.

Figure 7A:
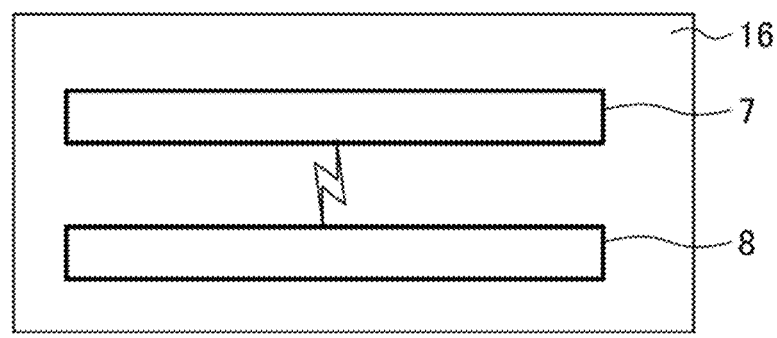
FIG. 7A is a diagram for describing a path of a dielectric breakdown occurring in an implementation process of the present invention.

FIG. 7A to FIG. 7D are diagrams each illustrating, in principle, a path for a dielectric breakdown occurring in an implementation process of the present invention. In FIG. 7A to FIG. 7D, corresponding portions are respectively assigned the same reference numerals. As illustrated in FIG. 7A, when a voltage between the first conductor 7 and the second conductor 8 is not less than 3 KV/mm as a dielectric breakdown strength, a dielectric breakdown occurs in air 16.

Figure 7B:
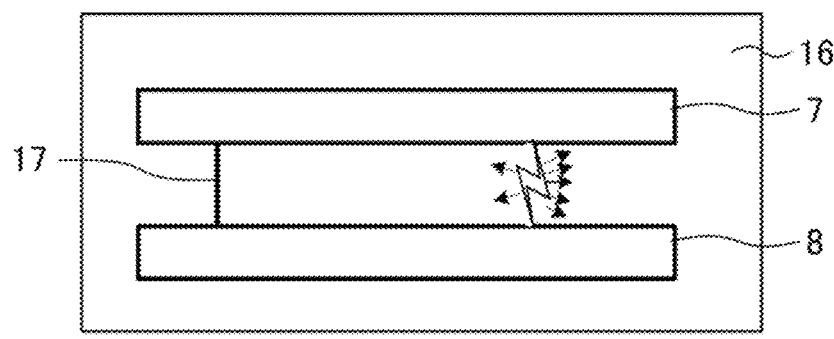
FIG. 7B is a diagram for describing a path of a dielectric breakdown occurring in an implementation process of the present invention.

As illustrated in FIG. 7B, if an insulator 17 is sandwiched between the first conductor 7 and the second conductor 8, a dielectric breakdown occurs when a voltage between the first conductor 7 and the second conductor 8 is not less than 40 KV/mm, for example, as a dielectric breakdown strength of the insulator 17. In a case illustrated in FIG. 7B, the first conductor 7, the second conductor 8, and the insulator 17 are placed in the air 16. The dielectric strength of the air 16 is lower, as compared with that of the insulator 17. Thus, a current due to a dielectric breakdown flows through a creepage surface on the air 16 side of the insulator 17. Accordingly, input energy is consumed on the air 16 side, not contributing to destruction of the insulator 17.

Figure 7C:
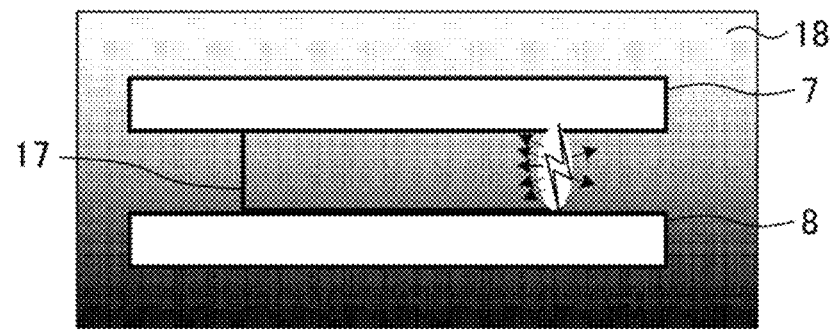
FIG. 7C is a diagram for describing a path of a dielectric breakdown occurring in an implementation process of the present invention.

FIG. 7C illustrates a state where the first conductor 7 and the second conductor 8 with the insulator 17 sandwiched therebetween are immersed in water 18, as in FIG. 7B. In the state illustrated in FIG. 7C, the water 18 has a larger dielectric strength than that of the air 16. Thus, in the state illustrated in FIG. 7B, many portions such as a shock wave due to the energy consumed on the air 16 side act on the insulator 17 side, whereby the insulator 17 can be destroyed.

Figure 7D:
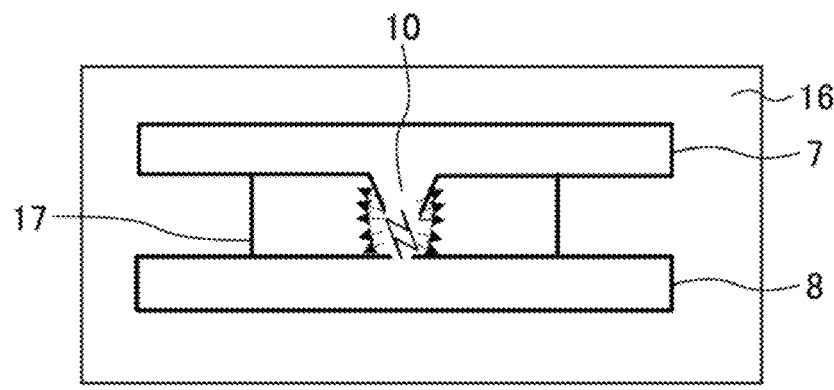
FIG. 7D is a diagram for describing a path of a dielectric breakdown occurring in an implementation process of the present invention.

On the other hand, when the first conductor 7 is provided with the protrusion 10, as in the embodiment of the present invention illustrated in FIG. 7D, a dielectric breakdown easily occurs, as described above, between the distal end of the protrusion 10 and the second conductor 8. The energy is not consumed on the air 16 side, and almost any part of the energy contributes to destruction of the insulator 17. That is, in a state illustrated in FIG. 7D, the shock wave or the like due to the dielectric breakdown effectively destroys the insulator 17 even if the insulator 17 is placed in the air 16.

Figure 8:
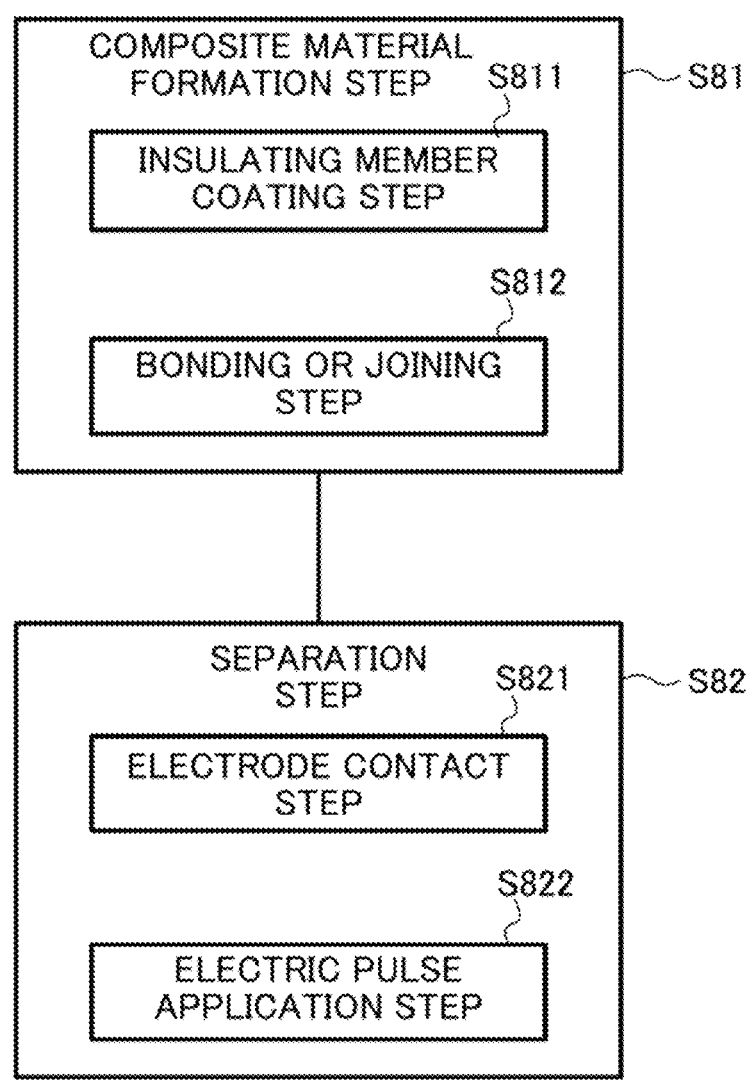
FIG. 8 is a process view illustrating a composite material decomposition method according to the embodiment of the present invention.

FIG. 8 is a process view illustrating a composite material decomposition method according to the embodiment of the present invention. In FIG. 8, description is made by appropriately referring to FIG. 1 to FIG. 3 already described. The composite material decomposition method includes a composite material formation step S81 and a separation step S82. The above-described composite material formation step S81 includes an insulating member coating step S811 and a bonding or joining step S812. In the insulating member coating step S811, the insulating member 9 functioning as an adhesive is applied to a surface on the protrusion 10 side of the first conductor 7 including the protrusion 10. Then, in the bonding or joining step S812, the first conductor 7 and the second conductor 8 positioned on the protrusion 10 side thereof are bonded or joined to each other with the insulating member 9 to form the composite material 1. The protrusion 10 in the first conductor 7 may be formed to pile up the welded piece of the conductor using the welding machine, as already described, for example. Alternatively, the protrusion 10 may be provided at the time of press molding.

The above-described separation step S82 includes an electrode contact step S821 and an electric pulse application step S822. In the electrode contact step S821, the positive electrode 12 is brought into contact with the first conductor 7, and the negative electrode 14 is brought into contact with the second conductor 8. Then, in the electric pulse application step S822, an electric pulse as a high-voltage pulse is applied between the positive electrode 12 and the negative electrode 14 via the positive electrode cable 11 and the negative electrode cable 13 from the high-voltage pulse generation device 3. When the electric pulse is thus applied, a shock wave or the like due to a dielectric breakdown is generated between the protruding end of the protrusion 10 and the second conductor 8. Accordingly, the shock wave or the like effectively destroys the insulating member. The insulating member 9 functioning as an adhesive is thus destroyed, and as a result the first conductor 7 and the second conductor 8 constituting the composite material 1 are separated from each other.

The electric pulse decomposition method, the composite material, and the composite material decomposition method according to the present embodiment produce the following effects.

In the electric pulse, decomposition method described in the item (1), a dielectric breakdown easily occurs between the protrusion 10 formed in the protrusion formation step S1 and the second conductor 8 close to and opposing the protrusion 10. A shock wave or the like caused by a current of the dielectric breakdown effectively destroys the insulating member. The insulating member 9 functioning as an adhesive is thus destroyed, and as a result the first conductor 7 and the second conductor 8 constituting the composite material 1 are separated from each other. Even when the composite material 1 is placed in air, a large part of energy is released into the air, thereby contributing to the destruction of the insulating member 9. Accordingly, a creeping discharge need not be suppressed with the composite material 1 placed in water, but can be easily induced. The induction of the creepage discharge in the water is not excluded.

In the composite material described in the item (2), a dielectric breakdown easily occurs between the distal end of the protrusion 10 and the second conductor close to and opposing the distal end, and a shock wave or the like caused by a current of the dielectric breakdown effectively destroys the insulating member 9 functioning as an adhesive, thereby making it possible to separate the first conductor 7 and the second conductor 8 constituting the composite material 1 from each other.

In the composite material decomposition method described in the item (3), in the composite material formation step S81, the insulating member 9 functioning as an adhesive is previously applied to the first conductor 7 including the protrusion 10, and the first conductor 7 and the second conductor 8 positioned on the protruding end side of the protrusion 10 are bonded or joined to each other to form the composite material 1. Accordingly, in the separation step S82, when the electric pulse is applied to the first conductor 7 and the second conductor 8, a dielectric breakdown easily occurs between the protrusion 10 in the first conductor 7 and the second conductor 8 close to and opposing the protrusion 10. A shock wave or the like caused by a current of the dielectric breakdown effectively destroys the insulating member. The insulating member 9 functioning as an adhesive is thus destroyed, and as a result the first conductor 7 and the second conductor 8 constituting the composite material 1 are separated from each other.

In the electric pulse decomposition method described in the item (4), the height of the protrusion 10 is appropriate, a dielectric breakdown easily occurs at the time of application of the electric pulse, and the insulating member 9 is effectively destroyed by a shock wave or the like caused by a current of the dielectric breakdown, thereby making it possible to separate the first conductor 7 and the second conductor 8 constituting the composite material 1 from each other.

In the composite material described in the item (5), the height of the protrusion 10 is appropriate, a dielectric breakdown easily occurs at the time of application of the electric pulse, and the insulating member 9 is effectively destroyed by a shock wave or the like caused by a current of the dielectric breakdown, thereby making it possible to separate the first conductor 7 and the second conductor 8 constituting the composite material 1 from each other.

In the composite material decomposition method described in the item (6), the height of the protrusion 10 is appropriate, a dielectric breakdown easily occurs at the time of application of the electric pulse, and the insulating member 9 is effectively destroyed by a shock wave or the like caused by a current of the dielectric breakdown, thereby making it possible to separate the first conductor 7 and the second conductor 8 constituting the composite material 1 from each other.

In the electric pulse decomposition method described in the item (7), a dielectric strength between the protrusion 10 and the second conductor 8 close to and opposing the protrusion 10 is further reduced, and the insulating member 9 is effectively destroyed by a shock wave or the like caused by a current of the dielectric breakdown, thereby making it possible to separate the first conductor 7 and the second conductor 8 constituting the composite material 1 from each other.

In the composite material described in the item (8), a dielectric strength between the protrusion 10 and the second conductor 8 close to and opposing the protrusion 10 is further reduced, and the insulating member 9 is effectively destroyed by a shock wave or the like caused by a current of the dielectric breakdown, thereby making it possible to separate the first conductor 7 and the second conductor 8 constituting the composite material 1 from each other.

In the composite material decomposition method described in the item (9), a dielectric strength between the protrusion 10 and the second conductor 8 close to and opposing the protrusion 10 is further reduced, and the insulating member 9 is effectively destroyed by a shock wave or the like caused by a current of the dielectric breakdown, thereby making it possible to separate the first conductor 7 and the second conductor 8 constituting the composite material 1 from each other.

Although the embodiment of the present invention has been described above, the present invention is not limited to this. The embodiment may be appropriately changed within the spirit and scope of the present invention. For example, the electric pulse decomposition method may be applied without fixing the composite material using the gripping apparatus or the like when applying the electric pulse depending on the form of the composite material.

EXPLANATION OF REFERENCE NUMERALS

1 . . . Composite material
2 . . . Gripping apparatus
3 . . . High-voltage pulse generation device
4 . . . Base
5 . . . Fixed gripping member
6 . . . Movable gripping member
7 . . . First conductor
8 . . . Second conductor
9 . . . Insulating member
10 . . . Protrusion
11 . . . Positive electrode cable
12 . . . Positive electrode
13 . . . Negative electrode cable
14 . . . Negative electrode
15 . . . Electrodeposition coating film
16 . . . Air
17 . . . Insulator
18 . . . Water

What is claimed is:

1. An electric pulse decomposition system for separating a composite material by an electric pulse, the electric pulse decomposition system comprising the composite material being obtained by bonding or joining a predetermined first conductor and a predetermined second conductor to each other with an insulating member, the composite material comprising:
   a protrusion provided in at least one of the first conductor and the second conductor to protrude toward the other conductor; and
   the insulating member to be applied in a region including a site where the protrusion is provided and bonding or joining the first conductor and the second conductor to each other,
   the electric pulse decomposition system further comprising:
   electrodes provided in one-to-one correspondence with the first conductor and the second conductor each electrode being in contact with a surface of the corresponding first or second conductor; and
   a pulse generator configured to separate the first conductor and the second conductor by applying an electric pulse between the electrodes to destroy the insulating member.

2. The electric pulse decomposition system according to claim 1, wherein a height of the protrusion is three-fourths or more of a thickness dimension of the insulating member.

3. The electric pulse decomposition system according to claim 2, wherein an insulating film is provided in the other conductor among the first conductor and the second conductors, and the protrusion contacts the film.

4. An electric pulse decomposition method for separating a composite material by an electric pulse, the composite material being obtained by bonding or joining a predetermined first conductor and a predetermined second conductor to each other with an insulating member, the composite material comprising:
   a protrusion provided in at least one of the first conductor and the second conductor to protrude toward the other conductor; and
   the insulating member to be applied in a region including a site where the protrusion is provided and bonding or joining the first conductor and the second conductor to each other,
   the electric pulse decomposition method comprising:
   bringing electrodes provided in one-to-one correspondence with the first conductor and the second conductor each of the electrodes into contact with a surface of the corresponding first or second conductor; and
   separating the first conductor and the second conductor by applying an electric pulse between the electrodes to destroy the insulating member.

5. The electric pulse decomposition method according to claim 4, wherein a height of the protrusion is three-fourths or more of a thickness dimension of the insulating member.

6. The electric pulse decomposition method according to claim 4, wherein an insulating film is provided in the other conductor among the first conductor and the second conductor, and the protrusion contacts the film.

* * * * *